United States Patent [19] [11] Patent Number: 5,154,482
Hayashi et al. [45] Date of Patent: Oct. 13, 1992

[54] OUTER SLIDING-TYPE SUNROOF

[75] Inventors: Kenichiro Hayashi, Toyota; Kazuhisa Nagata; Akira Nishimura, both of Okazaki; Hidekazu Otowa, Toyota, all of Japan

[73] Assignees: Aisin Seiki Kabushiki Kaisha, Kariya; Toyota Jidosha Kabushiki Kaisha, Toyota, both of Japan

[21] Appl. No.: 676,578

[22] Filed: Mar. 28, 1991

[30] Foreign Application Priority Data

| Mar. 31, 1990 [JP] | Japan | 2-33533[U] |
| Mar. 31, 1990 [JP] | Japan | 2-33534[U] |
| Mar. 31, 1990 [JP] | Japan | 2-33543[U] |
| Mar. 31, 1990 [JP] | Japan | 2-33544[U] |
| Mar. 31, 1990 [JP] | Japan | 2-33545[U] |
| Mar. 31, 1990 [JP] | Japan | 2-33546[U] |
| Mar. 31, 1990 [JP] | Japan | 2-33547[U] |

[51] Int. Cl.$^5$ .............................................. B60J 7/047
[52] U.S. Cl. ...................................... 296/223; 296/216; 296/220; 296/224
[58] Field of Search ................ 296/216, 220, 223, 224

[56] References Cited

U.S. PATENT DOCUMENTS

| 4,364,601 | 12/1982 | Katayama et al. | 296/223 X |
| 4,566,730 | 1/1986 | Knabe et al. | 296/223 X |
| 4,632,449 | 12/1986 | Masuda | 296/224 X |
| 4,647,104 | 3/1987 | Kohlpaintner et al. | 296/224 X |
| 4,749,225 | 6/1988 | Fuerst et al. | 296/216 |
| 4,822,097 | 4/1989 | Ishizuka | 296/220 X |

FOREIGN PATENT DOCUMENTS

| 60-215423 | 10/1985 | Japan . | |
| 63-114819 | 7/1988 | Japan . | |
| 63-119115 | 8/1988 | Japan . | |
| 8802552 | 5/1990 | Netherlands | 296/216 |

Primary Examiner—Dennis H. Pedder
Attorney, Agent, or Firm—Finnegan, Henderson, Farabow, Garrett & Dunner

[57] ABSTRACT

A sunroof assembly includes a housing secured to the inner side of a roof panel to surround an opening, a guide rail attached to each of opposing sides of the housing, a shoe disposed in the guide rail so as to be freely slidable longitudinally of the vehicle, a sliding panel connected to the shoe via a cam member for opening and closing the opening of the roof panel, and a driving source for sliding the shoe along the guide rail longitudinally of the vehicle, wherein a pin provided on the shoe is capable of moving in a cam groove of the cam member. One end of a link is pivotally attached to the pin of the shoe, and the other end is pivotally attached to one end of a lever member. The latter is slidably connected to a bracket, which is secured to the cam member and the sliding panel, so as to be relatively movable longitudinally of the vehicle in operative association with the shoe. When the sliding panel is in a fully closed state with the pin of the shoe at a forward end of the cam groove, the lever member is turned downwardly by a pin implanted in the bracket, so that the lever member is accommodated in a space between the slide channels of the guide rails.

7 Claims, 22 Drawing Sheets

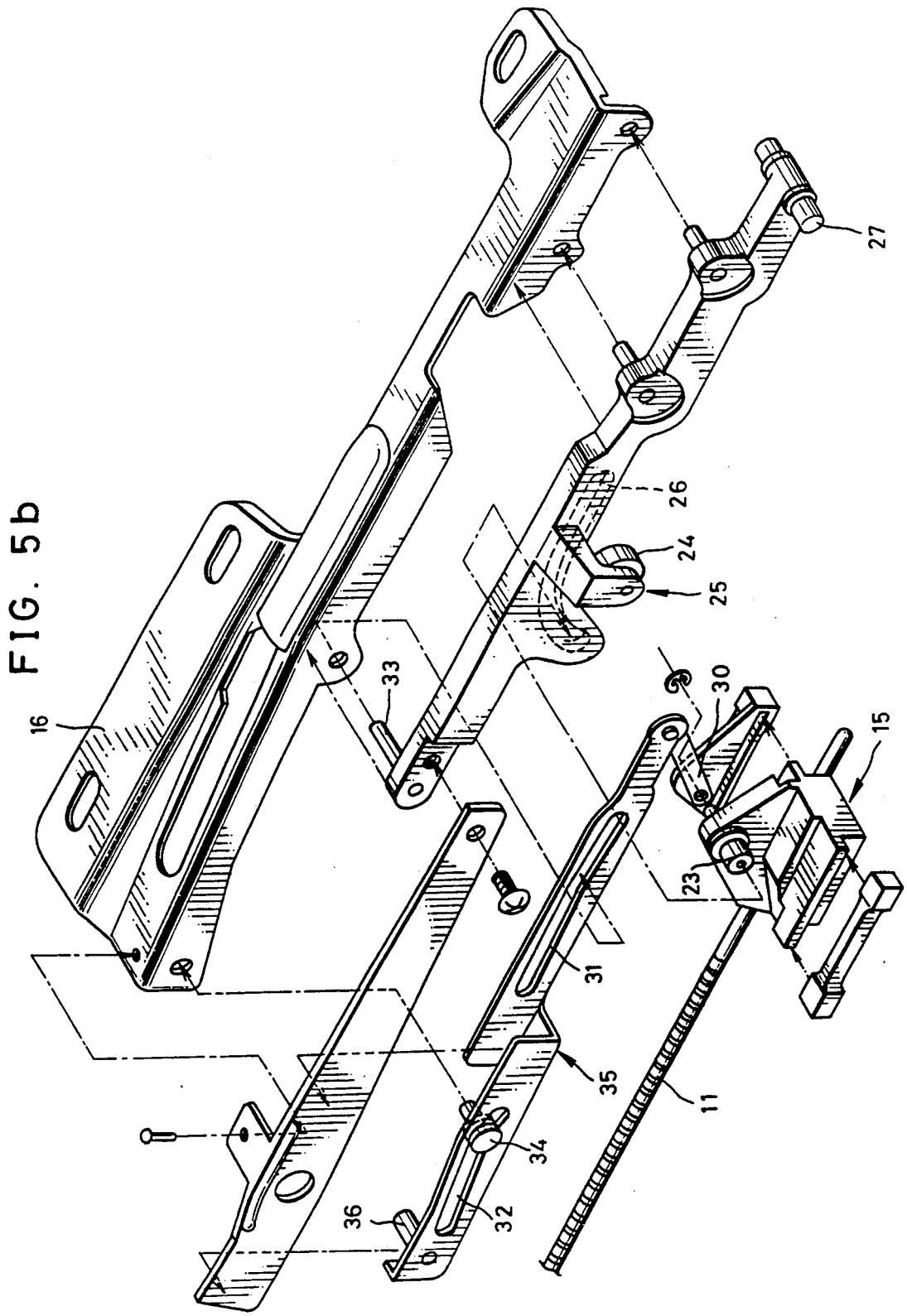

OUTER SLIDING-TYPE SUNROOF

BACKGROUND OF THE INVENTION

1. Field of the Invention

This invention relates to a sunroof and, more particularly, to improvements in an outer sliding-type sunroof.

2. Description of the Prior Art

Sunroof mechanisms for automotive vehicles have become popular in recent years. Specifically, the roof panel of an automotive vehicle is provided with an opening which can be opened and closed by sliding a sliding panel manually or electrically. The popularity of such sunroofs resides in the fact that a vehicle to which a sunroof is attached imparts a sensation of openness to the passengers and greatly improves ventilation within the passenger compartment.

The mechanism which opens and closes the roof panel opening by means of the sliding panel will now be described in brief.

A square housing having a central opening is fixed about the opening in the roof panel of an automotive vehicle. Guide rails extending longitudinally of the vehicle are secured to the left and right sides of the housing, an electric motor serving as a driving source is mounted on the rear portion of the housing, and the inner peripheral surface of the housing is made to serve as a rain trough so that rainwater can be drained to the outside via drain hoses. A shoe situated within each guide rail is installed, each shoe is connected to the sliding panel via a link having a cam mechanism, and the shoe is connected to the motor via a driving cable.

When a passenger switches on the mechanism in an opening direction, the motor is placed in operation and pulls the shoes rearwardly of the vehicle, thereby causing the rearward side of the sliding panel to rise about the front side and assume an upwardly tilted attitude. This upwardly tilted attitude is maintained for a time as the switch continues to be held in the opening direction. If this up-tilted state is desired, the passenger turns off the switch at this time. If it is desired to retract the sliding panel to fully open the roof panel opening, the passenger leaves the mechanism switched on. As a result, the motor continues to operate and retracts the up-tilted sliding panel to open the roof panel opening. This communicates the interior of the passenger compartment with the outside. In order to close the opening, the mechanism is switched on in the closing direction to operate the sliding panel in a manner which is the opposite of that described above.

Weather stripping is fixed to the periphery of the sliding panel. When the sliding panel is in the closed state, the weather stripping provides a seal between the sliding panel and the edge of the roof panel opening and prevents rainwater or the like from intruding into the passenger compartment. Drainage to the exterior is performed by the rain trough of the housing if rainwater should manage to penetrate the weather stripping seal. When the sliding panel is in the up-tilted state, rainwater which has attached itself to the outer surface of the sliding panel is discharged to the outside via the rain trough.

The outer sliding-type sunroof assembly has the basic construction described above. However, certain problems arise with this conventional sunroof assembly. By way of example, in the specification of Japanese Patent Application Laid-Open (KOKAI) No. 60-215423, a locking lever is constituted by a single member, and therefor the lever member is large in size. When a sliding panel is in the fully closed state, the lever must be housed above a guide rail and within the space of the sliding panel. As a result, the guide rail must be lowered, sufficient space cannot be furnished between the sliding panel and the roof, a large amount of headroom cannot be provided and the overall assembly is large in size.

Other problems are encountered as well, as also exemplified in the aforementioned specification of Japanese Patent Application Laid-Open (KOKAI) No. 60-215423. Specifically, a locking link having an implanted locking pin is pivotally attached to the rear end of the lever, and a locking body having a locking groove is riveted to the rear edge portion of the guide rail. When the sliding panel is in the fully closed state, the locking pin is inserted into the locking groove to maintain the sliding panel in the fully closed condition. Thus, a large number of locking members are required, resulting in a complicated structure. The amount of headroom available is diminished accordingly.

Still another problem encountered in the aforementioned specification of Japanese Patent Application Laid-Open (KOKAI) No. 60-215423 is that the lever member is not kept urged forwardly to maintain the prevailing state. Instead, the lever member is left free and therefore is likely to rattle owing to vehicle vibration or the like. In addition, if an accident should occur in which the vehicle rolls over, there is the danger that the locking pin of locking link provided in the end of link member will come out of the locking groove 46 of locking member.

Another difficulty is exemplified in the specification of Japanese Utility Model Application Laid Open (KOKAI) No. 63-114819. Here the sliding panel tends to flutter, when in the up-tilted attitude, owing to the machining precision of a guide shaft fitted into a cam groove as well as wear caused by long use.

Furthermore, in an outer sliding-type sunroof disclosed in the specification of Japanese Utility Model Application Laid-Open (KOKAI) No. 63-119115, movement of a bracket toward the outer side of the vehicle is not limited at the position of a pin. Consequently, position is not decided until the bracket is attached to a sliding panel, and reliability of operation as a guide rail assembly cannot be confirmed by moving a cable. In addition, this is accompanied by a decline in the accuracy with which the bracket is attached to the sliding panel.

Furthermore, in the sliding sunroof assembly having the basic construction described above, the tilt-up or tilt-down motion of the sliding panel is decided by the shape of a cam groove in a cam member. The conventional cam-groove shape is a combination of a straight portion, which is for the back-and-forth movement of a shoe independent of the sliding panel, and a linear inclined portion connected with the straight portion. When a pin in the shoe runs along the inclined portion of the cam groove, the sliding panel tilts in such a manner that the rear portion thereof ascends or descends. In other words, when the pin leaves the straight portion and makes the transition to the inclined portion, the angle of inclination of the sliding panel increases, and generally a maximum inclination angle of 5° can be selected. When the pin of the shoe enters the straight portion, the inclination angle is reduced to zero, i.e., the sliding panel assumes the fully closed state.

When the sliding panel is in the inclined state, air flows from the interior of the passenger compartment to the outside and attempts to raise the sliding panel. In other words, the force of the air drawn from the interior to the exterior of the passenger compartment acts against the operation for closing the sliding panel and, as a result, a larger torque is needed to closed the panel. In particular, as indicated by the straight line in FIG. 20, a large torque is necessary to close the sliding panel in an angular range of 0°-2°. An electric motor capable of providing such a high torque at closing of the panel is large in size and consumes a large amount of power.

SUMMARY OF THE INVENTION

An object of the present invention is to provide an outer sliding-type sunroof assembly in which the lever member is accommodated in as low a position as possible when the sliding panel is in the fully closed state, thereby solving the problem associated with headroom.

Another object of the present invention is to provide an outer sliding-type sunroof assembly in which an already existing guide rail groove is utilized for locking purposes to assure sufficient headroom in the simplest manner while at the same time improving the closing performance of the sliding panel and preventing erroneous operation.

Still another object of the present invention is to provide an outer sliding-type sunroof assembly in which rattling of the lever member is prevented when the sliding panel is in the fully closed state, and in which the lever member will not readily detach from the vehicle body, as from a guide rail, in the event of an accident.

A further object of the present invention is to provide an outer sliding-type sunroof assembly in which the sliding panel is capable of being moved smoothly without wobbling or fluttering even if parts and portions corresponding to the guide shaft develop play.

A further object of the present invention is to provide an outer sliding-type sunroof assembly in which component parts inclusive of a bracket are put into the form of a guide rail assembly, operation before the fact can be verified by an operating cable, and accuracy of attachment to the sliding panel can be improved.

Still another object of the present invention is to provide an outer sliding-type sunroof assembly in which the torque needed to close the sliding panel is reduced, thereby making it possible to employ a motor of smaller size, which in turn makes more space available for headroom or other items of equipment.

According to the present invention, the foregoing objects are attained by providing an outer sliding type sunroof assembly for an automotive vehicle having a roof panel provided with an opening, comprising: a housing fixedly secured to an inner side of the roof panel to surround the opening, the housing having opposing sides extending longitudinally of the vehicle; a guide rail attached to each of the opposing sides of the housing, each guide rail having a slide channel; a shoe disposed in the guide rail so as to be freely slidable longitudinally of the vehicle, the shoe having a pin; a cam member having a cam groove; the pin of the shoe being engaged with the cam groove of the cam member and being movable therealong; a sliding panel connected to the shoe via the cam member for opening and closing the opening of the roof panel; a driving source for sliding the shoe along the guide rail longitudinally of the vehicle; a bracket fixedly secured to the lever member and the sliding panel and having a pin implanted therein; a link having first and second ends, the first end of the link being pivotally attached to the pin of the shoe engaged with the cam groove of the cam member; and a lever member having one end to which the second end of the link is pivotally attached, the lever member being slidably connected to the cam member and the bracket so as to be relatively movable longitudinally of the vehicle in operative association with the shoe; wherein when the sliding panel is in a fully closed state with the pin of the shoe at a forward end of the cam groove, the cam groove is folded downwardly by the pin implanted in the bracket so that the lever member is accommodated in a space between the slide grooves of the guide rails.

Features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the accompanying drawings.

Figure 1:
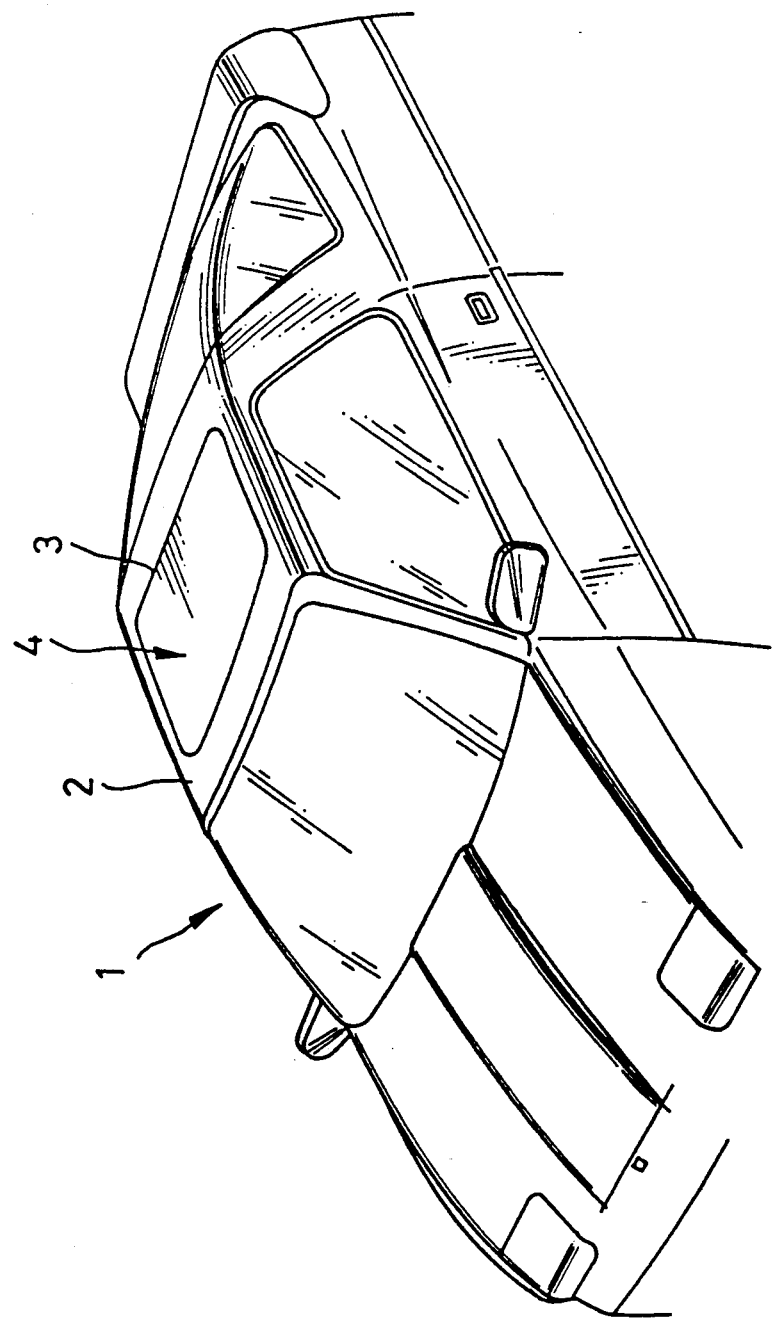
FIG. 1 is a partial perspective view of an automobile shown having a sliding panel in a fully closed state.
Figure 2:
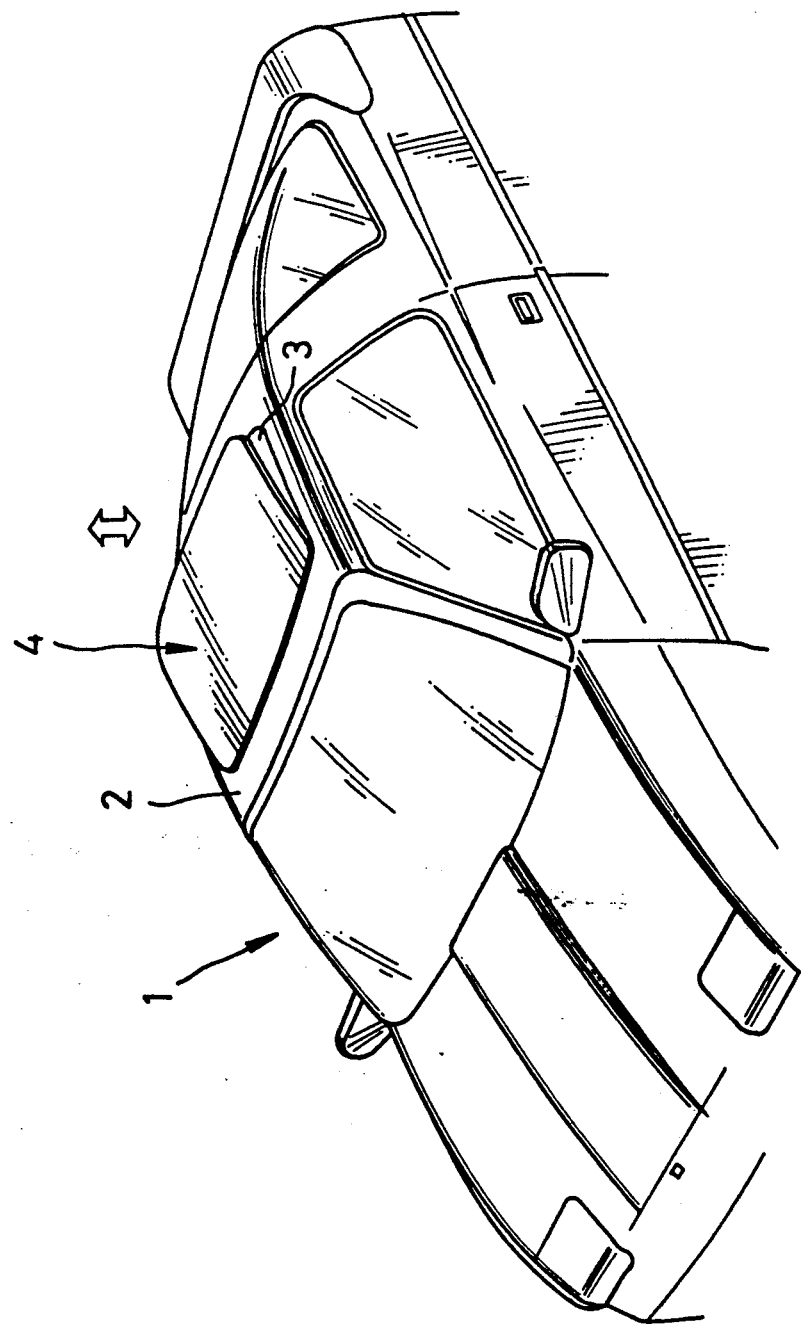
FIG. 2 is a partial perspective view of the automobile showing the sliding panel in an up-tilted state.
Figure 3:
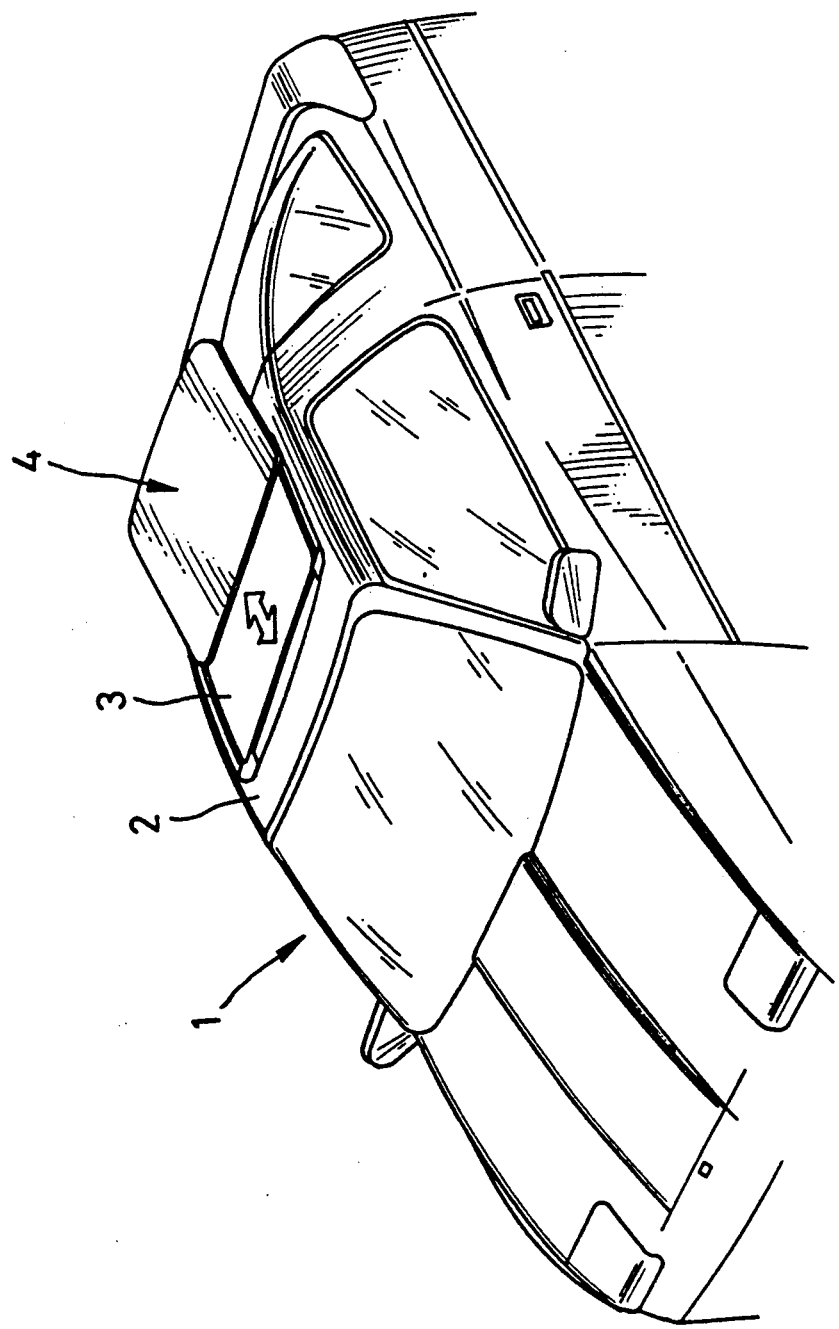
FIG. 3 is a partial perspective view of the automobile showing the sliding panel in a fully opened state.

As shown in FIGS. 1 through 3, an automobile 1 has a roof panel 2 provided with an opening 3. A sliding panel 4 is fitted into the opening 3 and is capable of assuming a fully closed state in which the opening 3 is closed (FIG. 1), an up-tilted state in which the rear side of the sliding panel 4 is raised and tilted upward (FIG. 2), and a fully open state (or partially open state) (FIG. 3). These states are capable of being selected by a mechanism described below.

Figure 4:
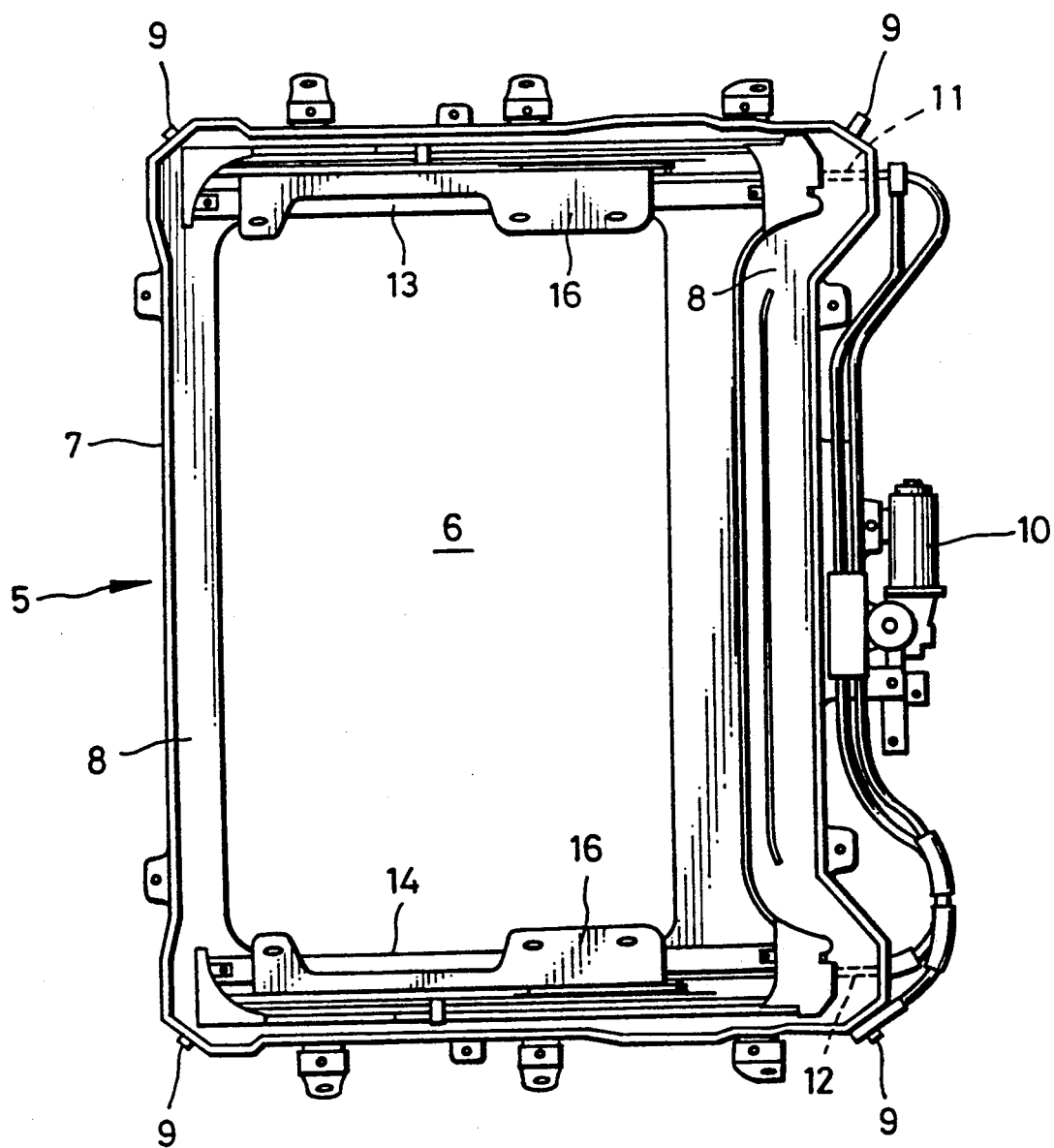
FIG. 4 is a plan view showing a mechanism for driving the sliding panel.

A mechanism shown in FIG. 4 is secured on the inner side of the roof panel 2 so as to surround the opening 3. The mechanism has a synthetic resin housing 5 that is generally square when viewed from a plane. The housing 5 has a centrally located opening 6 corresponding to the opening 3 in roof panel 2. The peripheral edge of the housing 5 forms the housing into a box-shaped configuration by means of an upstanding wall 7. The peripheral of the hole 6 also has an upstanding wall, thereby forming a trough 8 along the periphery of the housing 5 to discharge collected rainwater to the outside of the vehicle via drain ports 9. A motor 10 is fixedly secured to the rear portion of the housing 5. The output of the motor 10 is converted via a reduction mechanism into the pushing and pulling movement of driving cables 11 and 12.

Guide rails 13, 14, each of which represent a component in a mechanism to support and actuate the sliding panel 4, are secured to sides of the housing 5 that extend longitudinally of the vehicle, and a shoe 15 (FIGS. 5a–5c) is disposed in each of the guide rails 13, 14 so as to be free to slide longitudinally of the vehicle. The shoes 15 within the two guide rails 13, 14 are connected to respective ones of the drive cables 11, 12. Each shoe 15 is connected to the sliding panel 4 via a bracket 16 and a cam member 25, described later.

Figure 5A:
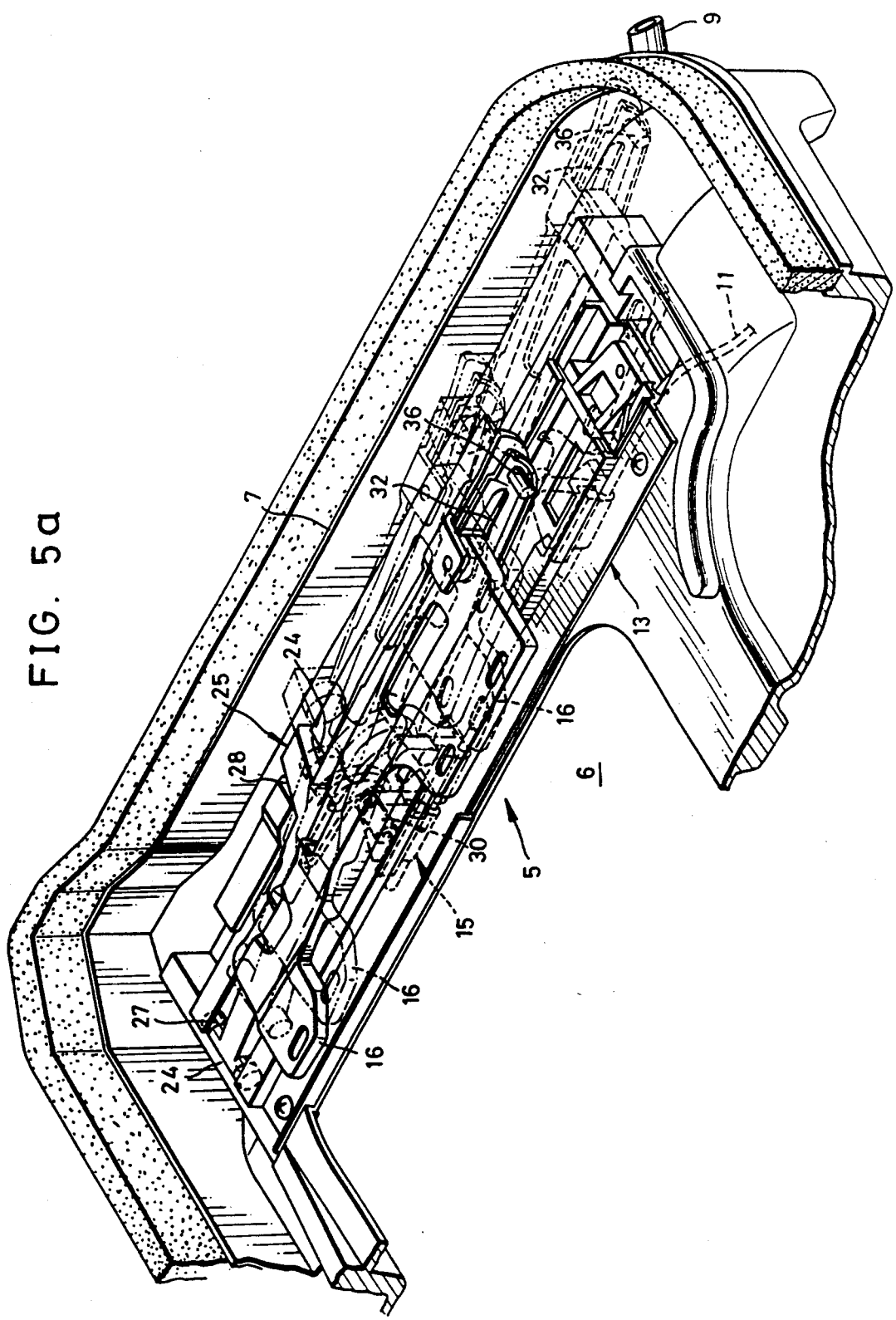
FIGS. 5(a), (b) and (c) are partial perspective views showing one guide rail and associated parts.
Figure 5C:
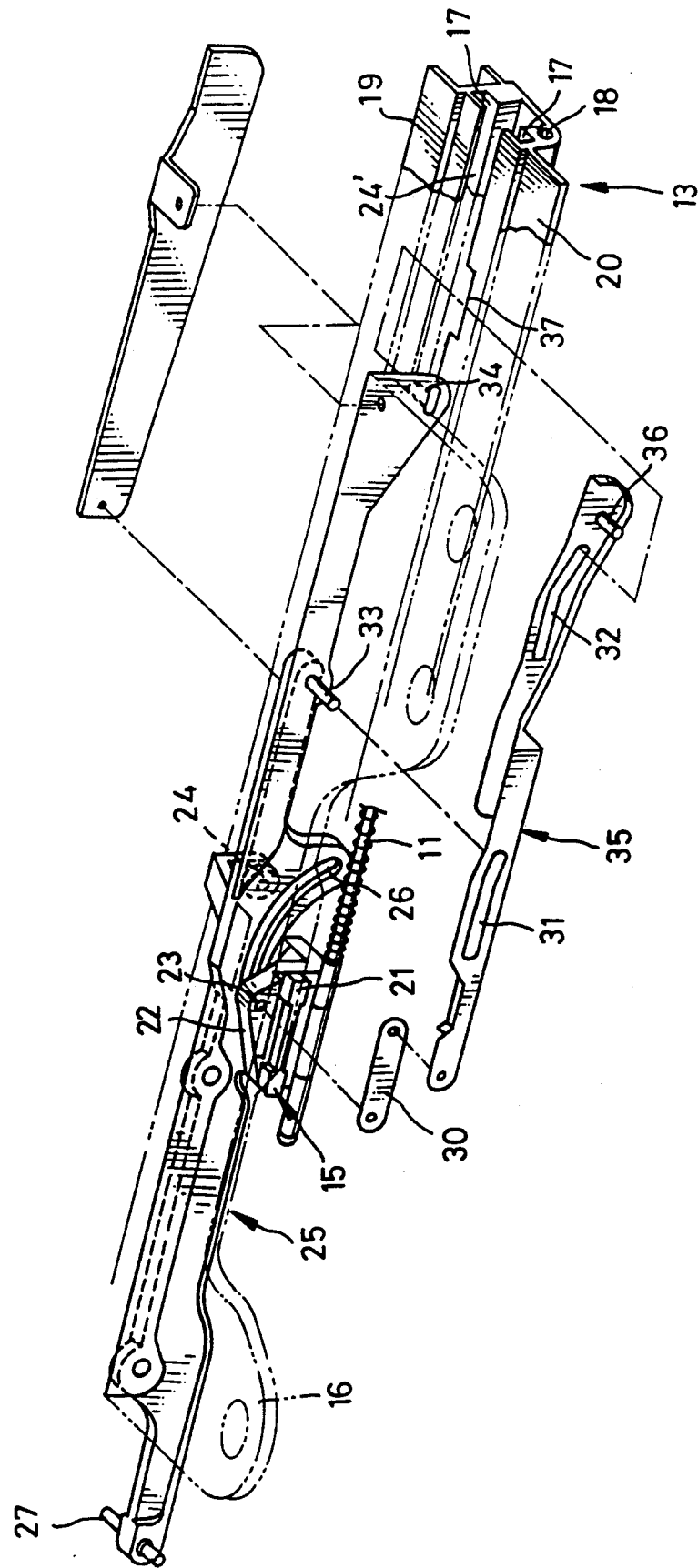

With reference to FIGS. 5(a), (b) and (c), the guide rail 13 has opposing walls formed to have inwardly facing grooves 17 (FIG. 5c) that oppose each other. The innermost of the walls is formed to have a generally circular hole 18 through which a driving cable 11 is passed. The upper portion of the guide rail 13 is formed to have flanges 19, 20 directed away from each other. The shoe 15 (FIG. 5b) has pieces 21 freely slidably accommodated within the grooves 17, and a vertical wall in which a pin 23 is supported. The driving cable 11 is secured to the inner side of the shoe 15. The pushing and pulling motion of the driving cable 11 resulting from operation of the motor 10 causes the shoe 15 to move back and forth along the guide rail 13.

A cam member 25 opposing the outer side face of the vertical wall 22 of shoe 15 and capable of being accommodated in a space between the opposing walls of the guide rail 13 has a cam groove 26 which receives the pin 23 of shoe 15. A piece 27 at the tip of the cam member 25 is slidably disposed in the opposing grooves 17. The cam groove 26 defines a generally circular arc. When the pin 23 moves back and forth within the cam groove 26, the rear portion of the cam member 25 is moved up and down about the piece 27 at the tip of the cam member.

The bracket 16 is secured to the side face of the cam member 25, and the front and rear ends of the sliding panel 4 are fastened to the bracket 16. By virtue of this arrangement, the up-and-down motion of the cam member 25 about the piece 27 produces the fully closed and up-tilted states of the sliding panel 4. In order to obtain the up-tilted state shown in FIG. 2 starting from the fully closed state of the sliding panel 4, the motor 10 is placed in operation to pull the driving cable 11. When this is done, the shoe 15 is retracted along the guide rail 13, during which time the pin 23 is moved along the cam groove 26 so that the rear end of the cam member 25 is lifted up about the piece 27 at the front end thereof. When the pin 23 abuts against the rear end of the cam groove 26, the operation for upwardly tilting the sliding panel 4 is completed. In operative association with the lifting up of the cam member 25 unitarily connected to the bracket 16, a roller 24, free to turn on a support arm 25' extending from the bracket, 16 exits upwardly from a vertical guide recess 28 (FIG. 6) inclined slightly to the rear. The roller 24 which emerges from the recess 28 is transferred to the flange 19. A forward wall 29 limits forward movement of the roller 24 from the recess 28.

Figure 8:
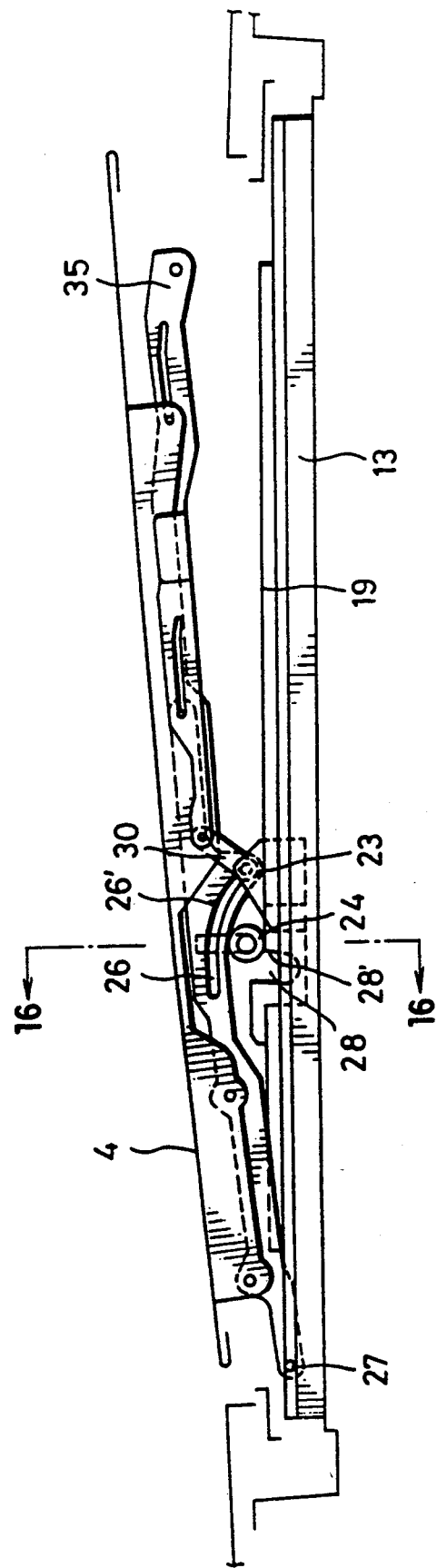

When the driving cable 11 is pulled further while the sliding panel 4 is in the up-tilted state as depicted in FIGS. 2 and 8, the shoe 15 pulls the cam member 25 to the rear because the pin 23 is in abutting contact with the rear end of the cam groove 26. As a result, the sliding panel 4 is retracted to completely free the opening 3 in roof panel 2 or in the state of FIGS. 3 and 9. This rearward movement of the sliding panel 4 is guided by the sliding of the piece 27 along the opposing grooves 17, the abutment of pin 23 against the cam groove 26 and the rolling of roller 24 on the flange 19. Thus, the sliding panel 4 will not exhibit play or looseness.

One end of a link 30 (FIG. 5c) is pivotally supported on the pin 23 of shoe 15. One end of a lever 35 is pivotally connected to the other end of the link 30. The lever 35 has a pair of grooves 31, 32. A pin 33 at the end of the cam member 25 opposite from the piece 27 is passed through the groove 31, and a pin 34 at the rear end of the bracket 16 is passed through the other groove 32 as shown in FIG. 5b. When the sliding panel 4 is in the attitude fully closing the opening 3, the pins 33, 34 abut against the front ends of each of the respective grooves 31, 32. When the sliding panel 4 is placed in the up-tilted state and in the fully opened state, the pins 33, 34 abut against the opposite ends of the respective grooves 31, 32. A pin 36 is implanted in the end portion of the lever 35 opposite from the one end connected to the link 30. The length of the cam groove 26 decides the front and rear positions of the pin 36. Since the cam groove 26 is horizontal over the portion thereof receiving the pin 23 during movement of the shoe 15 to retract the panel 4 from the fully closed position to the position at which the sliding panel 4 starts to assume the up-tilted state, the pin 36 moves rearwardly, in operative association with the shoe 15 and link 30, during movement of the sliding door from the fully closed position to the position at which it starts to assume the up-tilted state. When the sliding panel starts to be tilted upward as shown in FIG. 2, the pin 36 is substantially in the center, longitudinally speaking, of a cut-out 37 (FIG. 5c) formed in the inward flange 20 of the guide rail 13. In response to further tilting of the sliding door, the pin 36 rises free of the cut-out 37 via the link 30 along with the rising movement of the cam member 25. Conversely, in order to move the sliding panel from the tilted state of FIG. 2 to the fully closed state of FIG. 1, first the sliding panel is returned to the state at which tilting begins. This accompanies the descent of the cam member 25. When this occurs, the pin 36 returns to the cut-out 37 and the sliding panel 4 assumes the fully closed state of FIG. 1. When the shoe 15 is advanced further, the pin 23 moves to the front end of the cam groove 26 along the horizontal portion thereof, and the pin 36 recedes into the flange 20 and abuts against its inner surface. As a result, when fully closed, the sliding panel 4 is supported on the side of the housing at three points, namely by the piece 27 of the cam member 25, the pin 23 of the shoe 15 and the pin 36 of the lever 35. The sliding panel 4 therefore will not vibrate. When the sliding panel 4 is shifted from the state of FIG. 1 to the state of FIG. 2, the shoe 15 is retracted slightly and the pin 36 is brought opposite the cut-out 37, after which tilting of the sliding panel starts.

Figure 7:
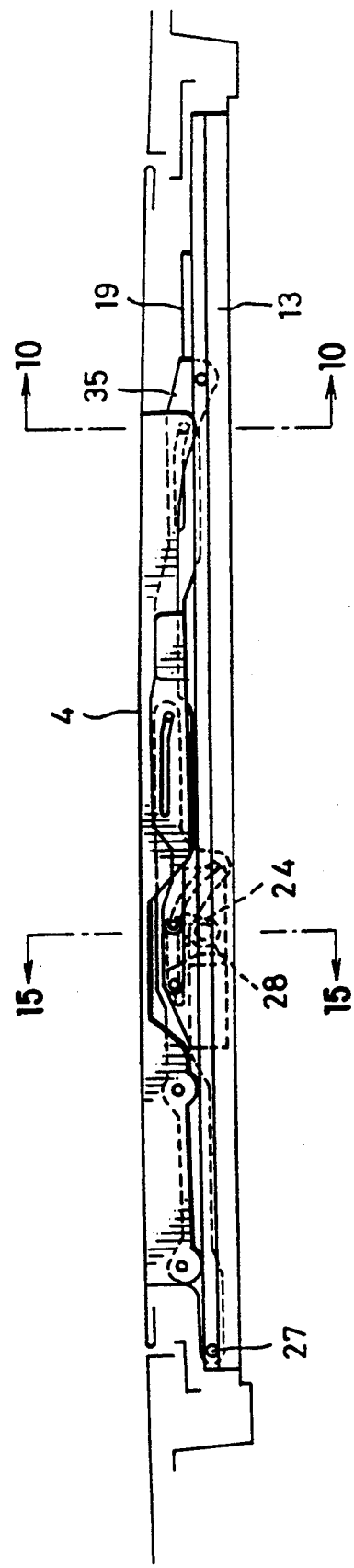
FIGS. 7, 8 and 9 are views showing the mechanism in the fully closed, tilted and fully open states of the sliding panel corresponding to the views of FIGS. 1, 2 and 3, respectively.
Figure 9:
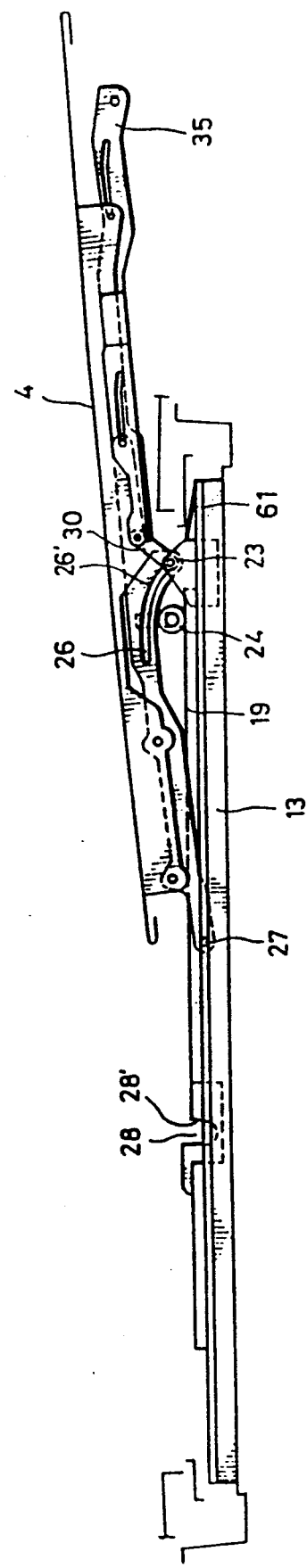

FIGS. 7, 8 and 9 are diagrams showing operation of the mechanism and correspond to the fully closed state, up-tilted state and fully open state of FIGS. 1, 2 and 3, respectively.

Figure 10:
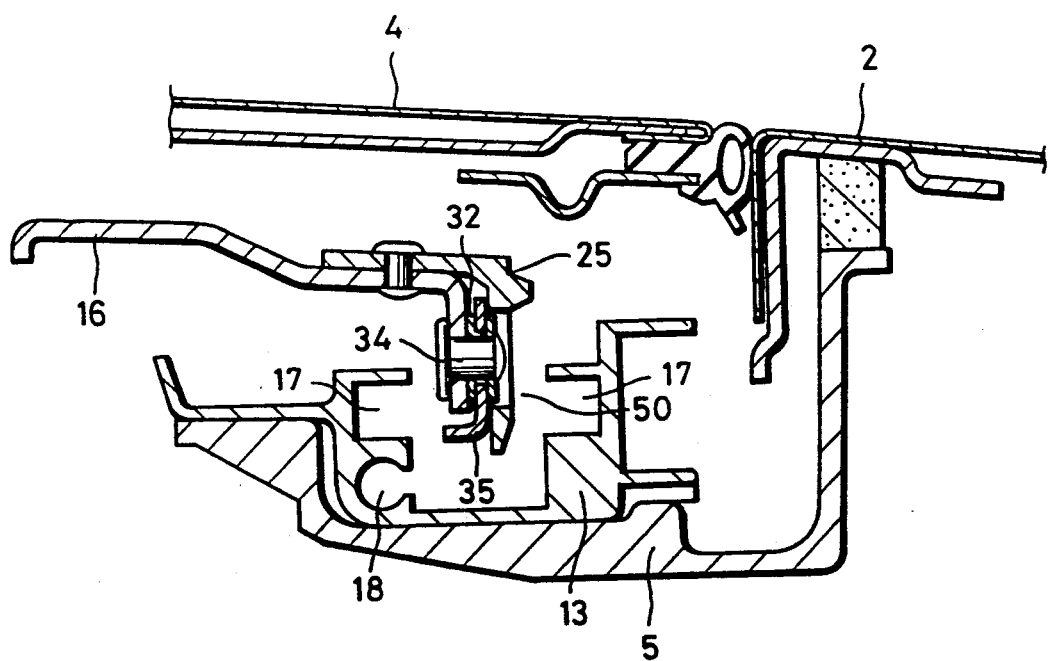
FIG. 10 is a sectional view showing, in enlarged form, a principal portion of the invention sectioned along line 10—10 of FIG. 7.

The principal portions of the present invention will now be described with reference to FIG. 10, which is a sectional view taken along line B—B of FIG. 7.

When the sliding panel 4 is in the fully closed state, the pin 23 is situated at the forward end of the cam groove 26 and all of the component parts are accommodated in the space between the guide rail 13 and the sliding panel 4. Since the lever member 35 and link 30 are constituted by separate elements capable double folding (see FIGS. 8 and 9), the groove 32 of lever member 35 is turned inward by the pin 34 implanted in the bracket 16 unitarily connected to the cam member 25. Consequently, the lever member 35, along with the cam member 25 and the lower end of the bracket 16, are accommodated within a space 50 formed between the pair of sliding grooves 17, for the separate pair of shoes 15, formed in the rail 13.

Thus, when the sliding panel 4 is in the fully closed state, the lever member 35 can be readily accommodated in the space defined within the guide rail 13. As a result, more components can be disposed above the guide rail, so that space can be assured between the sliding panel 4 and the automobile roof. Accordingly, a sufficient amount of headroom can be provided and space within the passenger compartment can be maximized.

Figure 11:
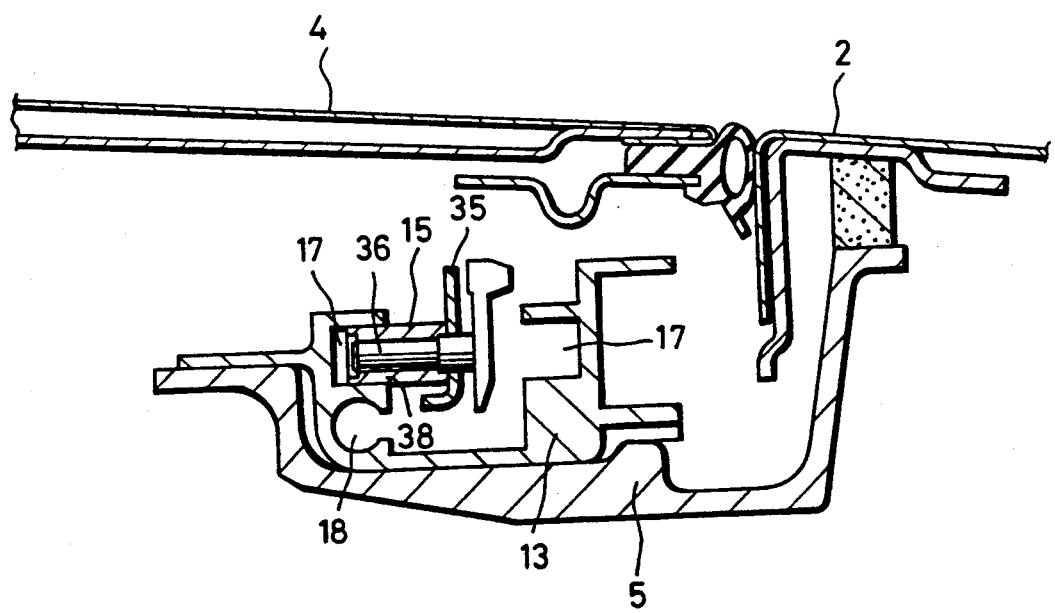
FIG. 11 is a sectional view showing, in enlarged form, a principal portion of the invention.

FIG. 11 illustrates the sliding panel 4 in the fully closed state. The pin 36 secured to the lever 35 so as to point toward the inner side of the vehicle is inserted, with a suitable clearance 38 in the vertical direction, into the inner groove 17 of rail 13 along which the sliding shoe 15 is presently located. The pin 36 rises above the cut-out 37 (FIG. 5) when the sliding panel 4 is tilted up and fully opened.

It should be noted that forward and rear end portions of the cut-out 37 curve upward slightly and form rising surfaces for guidance in order that the pin 36 may readily exit and enter the groove 17 of guide rail 13.

Figure 12:
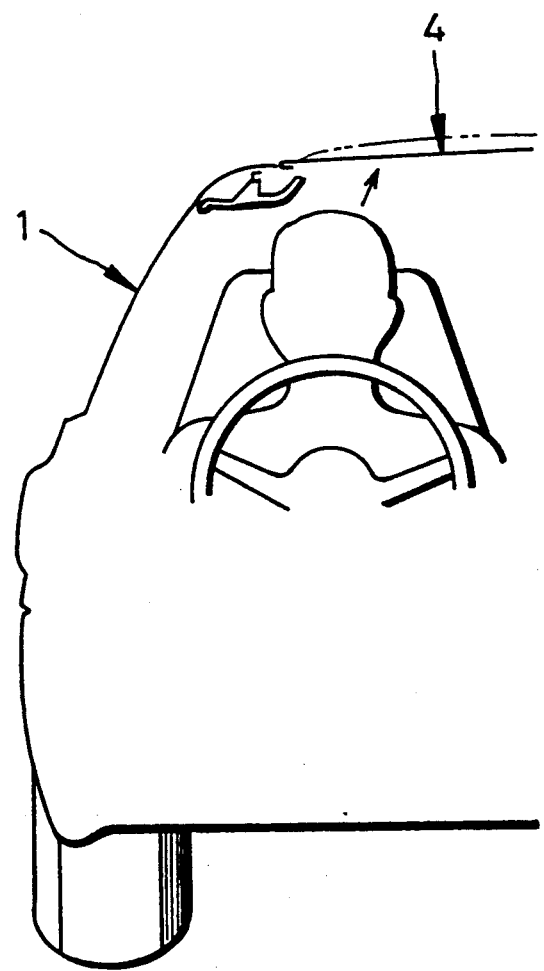
FIG. 12 is a referential view showing the effects of the present invention.

Thus, when the sliding panel 4 is in the fully closed state, movement of the sliding panel 4 greater than that necessary in the vertical direction is limited by the strongly rigid guide rail 13, which is secured to the housing 5 attached to the vehicle body, via the bracket 16, lever 35 and pin 36. Consequently, even if the vehicle should happen to roll over in the event of an accident, the sliding panel 4 will not crush inwardly owing to an external force and a space will not form at the ceiling of the vehicle. In addition, the rear portion of the sliding panel 4 will not be crushed and forced into the passenger compartment. Furthermore, as shown in FIG. 12, if the vehicle experiences a large bounce so that the head of a passenger applies an upward urging force to the sliding panel 4, there is no danger that the latter will be dislodged.

Further, in order to establish the fully closed state, a very simple structure is adopted in which the groove of the already existing guide rail is utilized and the pin projecting from the lever 35 is inserted into the groove. This makes it possible to dispense with the complicated prior-art structure which relies upon a large number components parts exclusively for locking. Accordingly, the amount of headroom can be increased correspondingly, closing of the sliding panel is facilitated, and erroneous operation is prevented.

As described above in connection with FIG. 11, which illustrates the sliding panel 4 in the fully closed state, the pin 36 secured to the lever 35 so as to point toward the inner side of the vehicle is inserted, with a suitable clearance 38 in the vertical direction, into the inner groove 17 of rail 13 along which the sliding shoe 15 is presently located. The pin 36 rises above the cut-out 37 (FIG. 5) when the sliding panel 4 is tilted up and fully opened.

Figure 13:
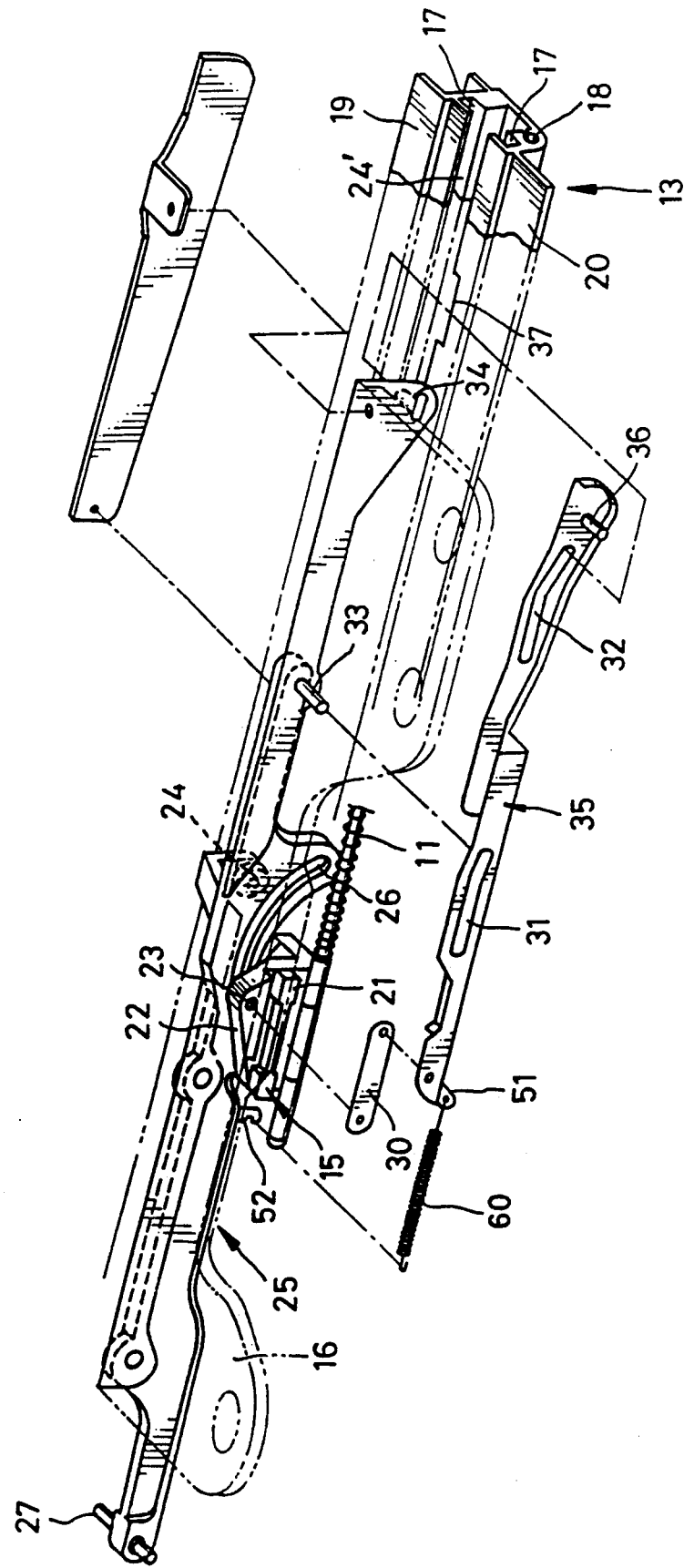
FIGS. 13 and 14 are exploded, perspective views showing second and third embodiments of the present invention.
Figure 14:
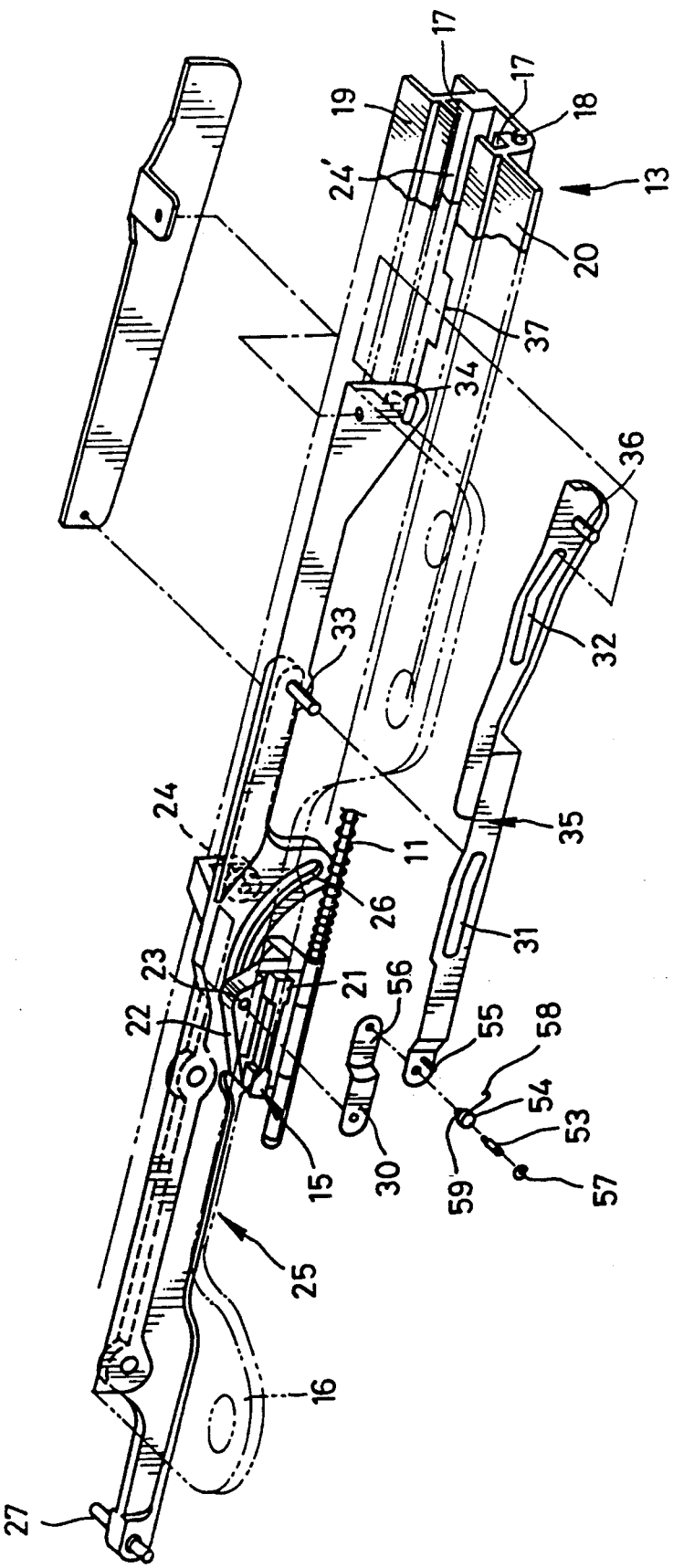

FIG. 13 illustrates an embodiment in which a spring 60, which urges the lever 35 forwardly at all times, is stretched between a spring anchor portion 51 of the lever 35 and a spring anchor portion 52 formed at a suitable location on bracket 16. FIG. 14 illustrates still another embodiment, in which a coil spring 54 is disposed about a pin 53 implanted in the forward end portion of lever 35, one end 58 of the coil spring 54 is fixed by an anchor pin 55 secured in the lever 35, and another end 59 of the spring is fixed in a small hole 56 provided in the link 30. As a result, the lever 35 is biased forwardly at all times by the restoration force of the coil spring 54.

Thus, when the sliding panel 4 is in the fully closed state, the lever 35 is biased forwardly at all times by the spring means. This prevents looseness and the generation of noise.

Since the pin 36 in the slide groove 17 also is biased forwardly at all times, these embodiments are effective in assuring that the fully closed state of the sliding panel 4 will be maintained in the event of an accident.

Figure 6:
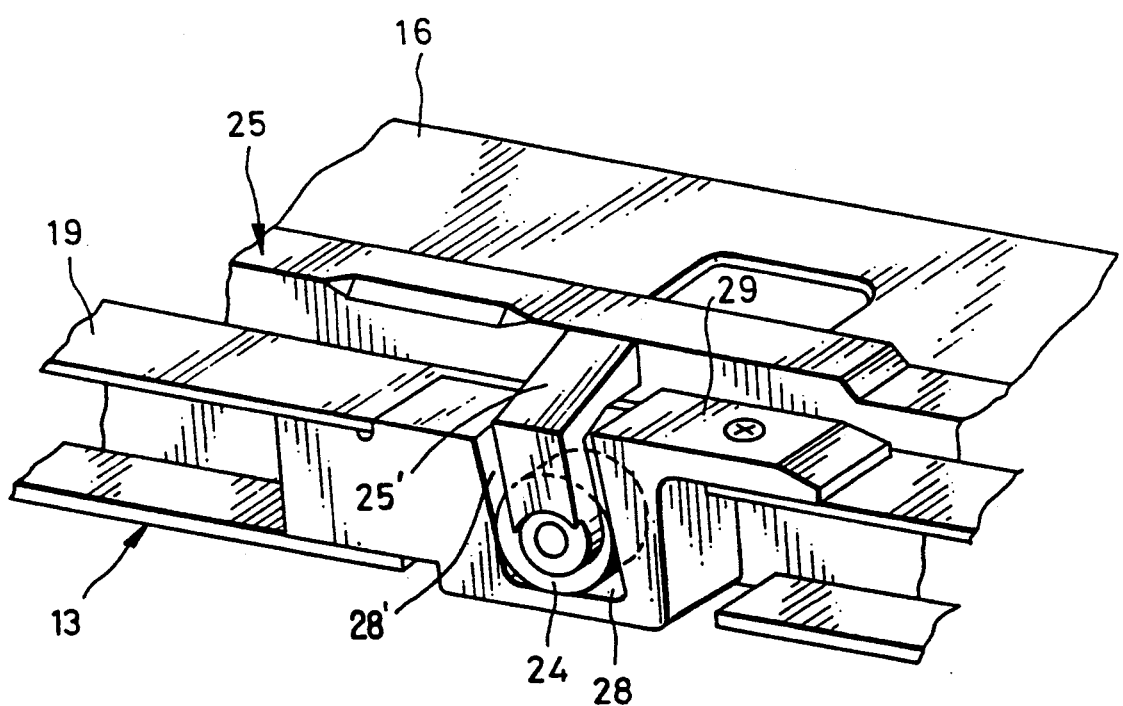
FIG. 6 is a partial perspective view showing, in enlarged form, a roller guiding a cam member.

Reference will again be had to FIGS. 7 through 9. FIGS. 7, 8 and 9 illustrate the fully closed state, up-tilted state and fully opened state, respectively of the sliding panel 4 when viewed from the side. In FIG. 7, the roller 24 is received within the recess 28, as illustrated in FIG. 6, and the sliding panel 4 is in the fully closed state. In order to place the sliding panel 4 in the tilted state, the motor 10 is placed in operation to pull the driving cable 11, whereupon the roller 24 exits upwardly from the recess 28 and mounts the flange 19 through the sequence of operations described earlier. Thus, a transition is made to the state shown in FIG. 8.

Figure 15:
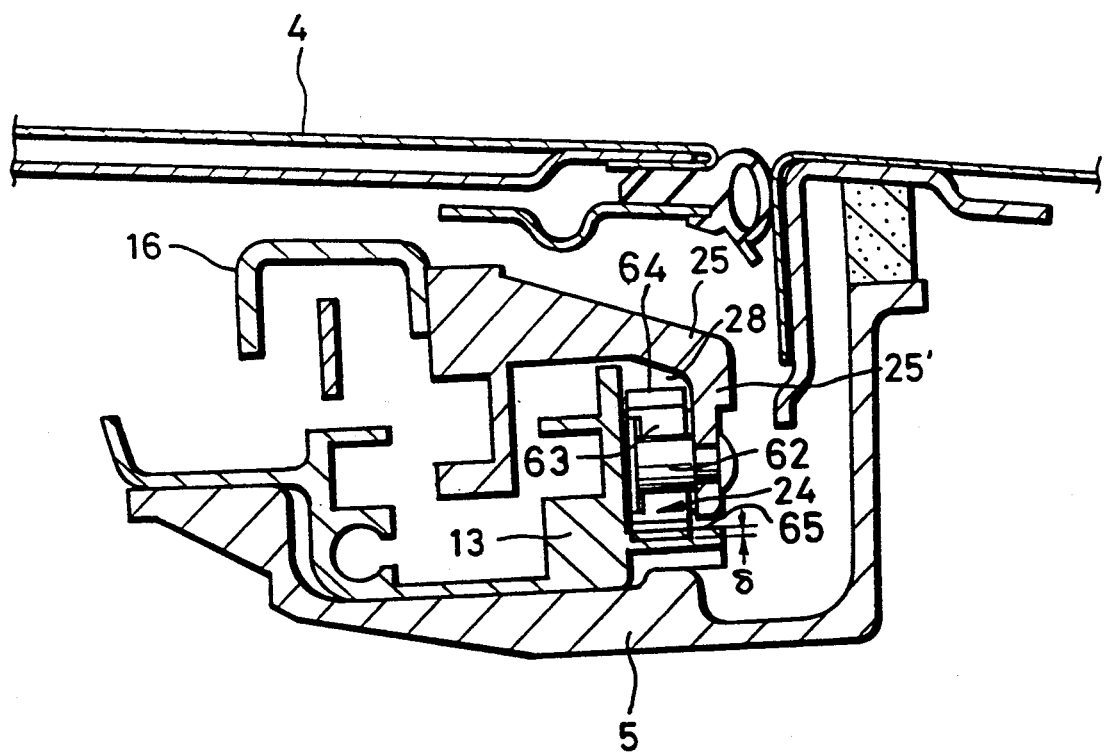
FIG. 15 is a partially enlarged view showing a section taken along line 15—15 of FIG. 7.
Figure 16:
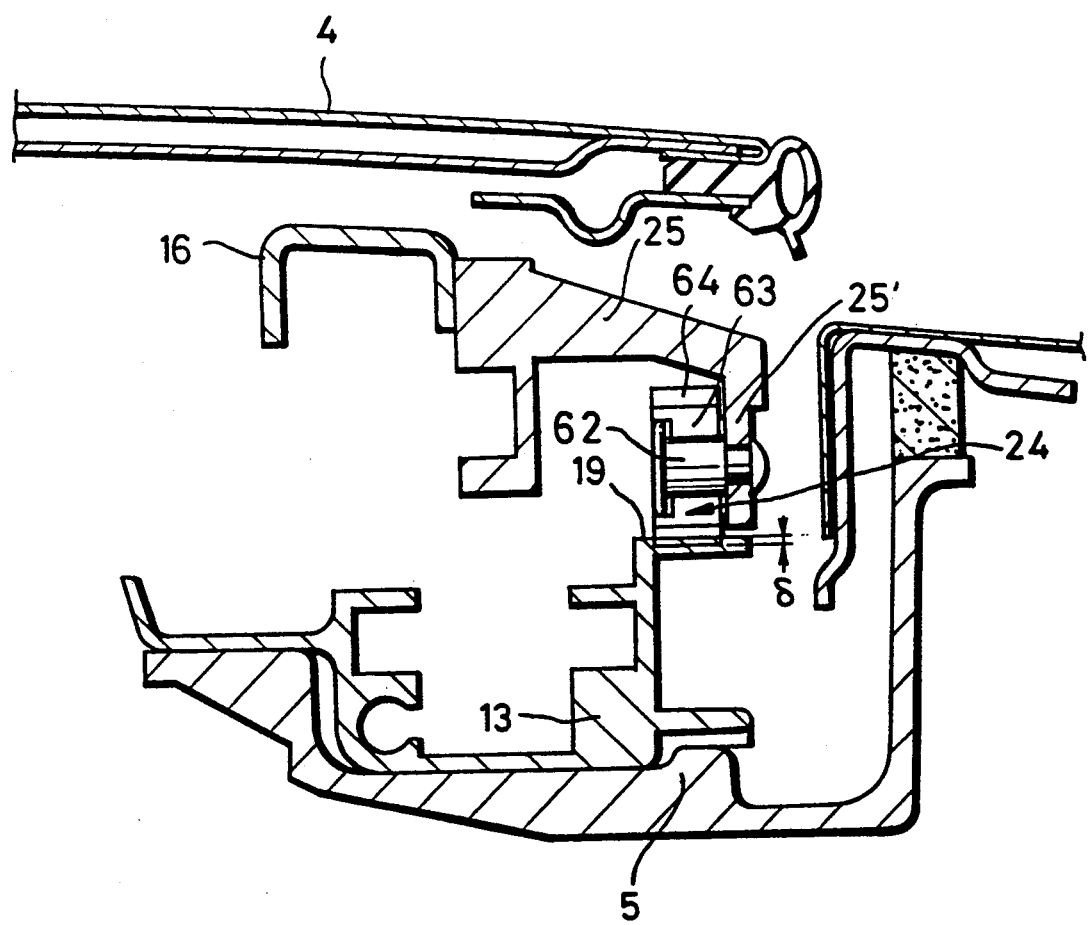
FIG. 16 is a partially enlarged view showing sections taken along lines 16—16 of FIG. 8.

In order to establish the fully open state, the roller 24 is caused to roll backward along the flange 19 until the shoe 15 abuts against a stopper 61 provided at the rear end of the slide groove 17 through the sequence of operations described above. At this moment the sliding panel 4 assumes the fully open state. In the fully closed state of FIG. 15, the roller 24 resides in the recess 28 of the guide rail 13. The roller 24 is freely rotatably supported on a support arm 25' of cam member 25 by a pin 62. The roller 24 comprises a metallic inner wheel 63 which rolls about the pin 62, and a resilient outer wheel 64 fitted onto the outer periphery of the inner wheel 63. The outer wheel 64 is in contact with the lowermost surface 65 of the recess 28. The weight of the sliding panel 4 and of each of the components operatively associated with the sliding panel is borne by the guide rail 13 at four points, namely the piece 27, which serves as a fulcrum, the shoe 15, the pin 36 and the roller 24. When the weight is borne, the resilient outer wheel 64 flexes by an amount δ, as shown in FIG. 15. Next, FIG. 16 illustrates the state at completion of tilting (FIG. 8) and when the sliding panel is fully open (FIG. 9). In either case, the roller 24, along with the shoe 15, bears the weight of the sliding panel 4 and the like at three points, with the piece 27 serving as a fulcrum, and the roller 24 flexes on the flange 19 by the amount δ.

When the sliding panel 4 is tilted up from the fully closed state, the pin 23 in cam groove 26 moves to an inclined surface 26' (which is substantially arcuate), which slants downwardly and rearwardly from the horizontal portion of the groove 26, as the shoe 15 moves rearwardly. The pin 23 pushes the surface 26' upwardly so that the cam member 25, bracket 16 and the rear portion of the sliding panel 4 are raised with the piece 27 serving as a fulcrum. At the same time, as shown in FIG. 6, the resilient roller 24 comes into resilient contact with a rearwardly inclined surface 28' of the recess 28 to rise rearwardly and upwardly. The resilience of the roller 24 at this time smoothens the rolling action on the inclined surface 28'. Further, when the transition is made to the up-tilted state, the relative contact position between the roller 24 and inclined surface 28' and between the cam groove 26 and pin 23 are shifted a considerable amount in the longitudinal direction (the roller 24 is ahead in this embodiment), as will be appreciated from FIG. 8. Therefore, flapping or rattling of the sliding panel 4 is prevented. When the transition is made from the fully up-tilted state to the fully open state, lift-up is performed while the roller 24 rolls and flexes by the amount δ on the flange 19 of the guide rail 13. As a result, looseness of each component is absorbed and a smooth transition is made.

Thus, even if each structural portion develops looseness, especially with long use, the resilient roller absorbs this looseness both when the transition is made to the up tilted state and to the fully open state. This serves to prevent rattling of the sliding panel. In addition, rattling of the sliding panel is suppressed since the relative position between the roller and shoe is shifted in the longitudinal direction. Moreover, since the weight of the sliding panel, etc., is borne also by the resilient roller at all times, strength is assured.

Figure 17:
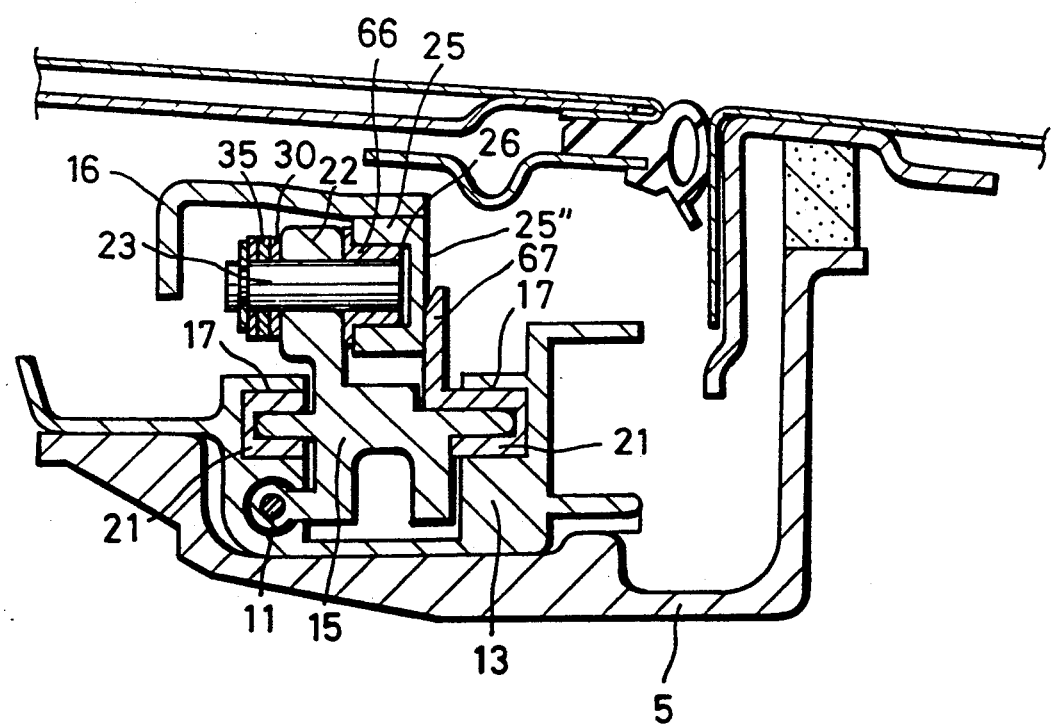
FIG. 17 is a sectional view showing, in enlarged form, a principal portion of the invention.

FIG. 17 illustrates, in enlarged form, a cross section of a portion where the pin 23 implanted in the shoe 15 is fitted via a slider 66 into the cam groove 26 of the cam member 25 when the sliding panel 4 is in the fully closed state. The pieces 21 of shoe 15 are freely slidably fitted into the groove 17 of the guide rail 13. An upstanding wall 67 extends from the piece 21 nearer the outer side of the vehicle (the right side as seen in FIG. 17) and abuts against an outer wall surface 25" of cam member 25. Thus, rightward (outward) movement of the cam member 25 and of the bracket 16 affixed thereto is limited.

The shoe 15 and cam member 25 undergo relative movement in the longitudinal direction by an amount equivalent to the length of cam groove 26 from the time of the fully closed state to the time of the up-tilted state. Meanwhile, however, the upstanding wall 67 is in opposed, abutting contact with the outer wall surface 25" of the cam member 25. As a result, contact between the upstanding wall 67 and the outer wall surface 25" is assured when the sliding panel 4 is in an up-tilted state other than that of the Figure and when the sliding panel 4 is placed in the fully open state by retracting the shoe 15 and the cam member 25 in unison.

Thus, the cam member, namely the bracket, has its movement toward the outer side of the vehicle limited at all times by the upstanding wall provided on the shoe. Consequently, the reliability of operation of the guide rail assembly which includes the bracket can be confirmed by operating the cable before installation in the sliding sunroof, and therefore the position of the bracket with respect to the guide rail also is assured. This assures the precision of installation in the sliding panel. Furthermore, the upstanding wall performs the function of stopping means even with respect to an external force acting upon the outer side of the sliding panel (bracket). This affords an improvement in terms of strength as well.

Figure 18:
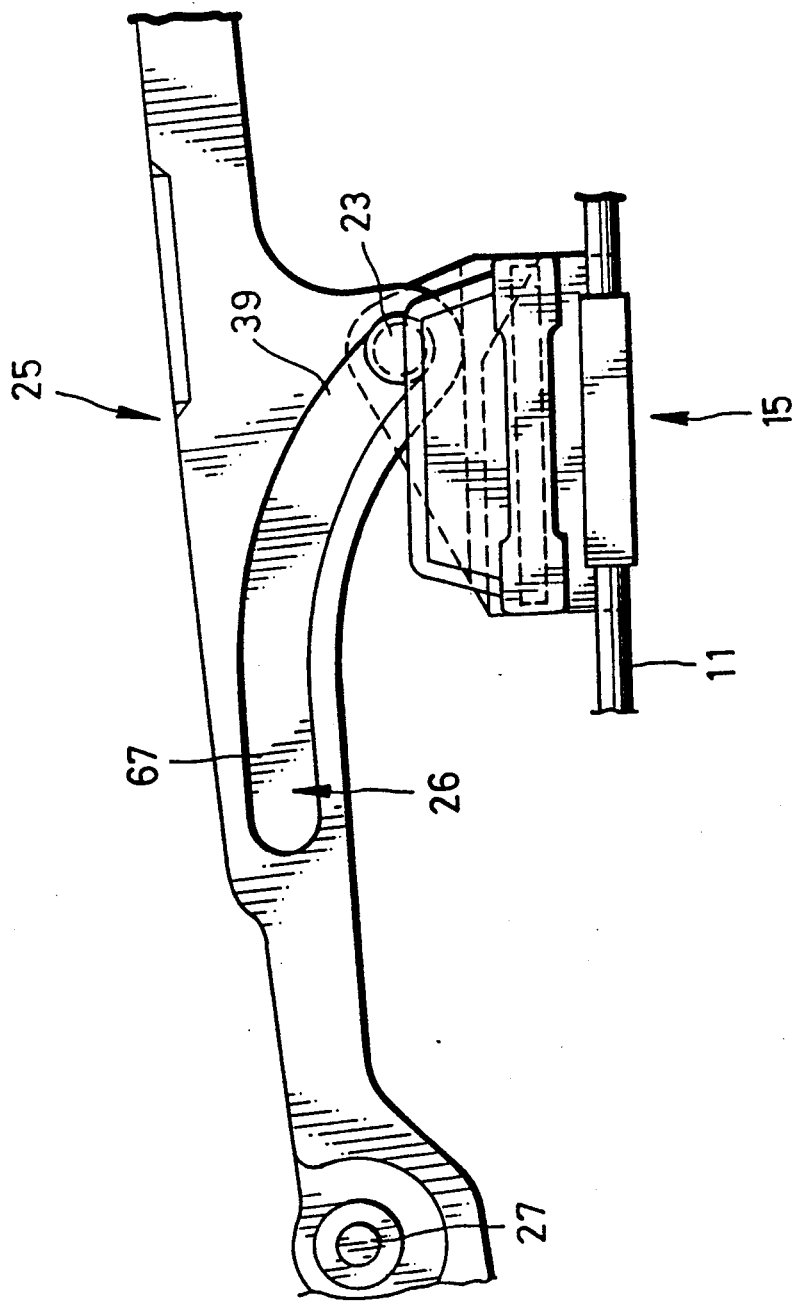
FIG. 18 is a side view showing a cam groove.

As shown in FIG. 18, the cam groove 26 of cam member 25 comprises a straight portion 67 and an arcuate portion 39 whose center of curvature is located below the cam groove 67. The straight portion 67 and the arcuate portion 39 are smoothly connected.

Figure 19:
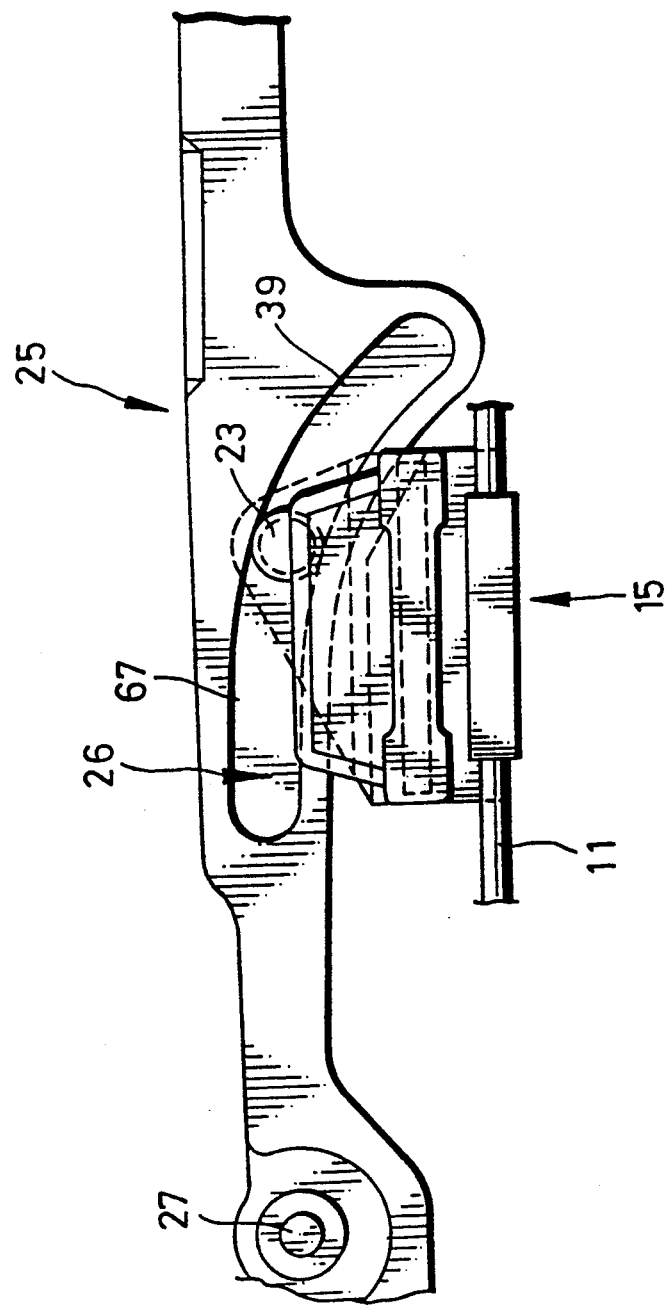
FIG. 19 is a side view showing a state in which a sliding panel inclined at an angle of 1.

When the pin 23 of shoe 15 slides along the straight portion 67, the shoe 15 moves back and forth independently of the cam member 25. When the pin 23 enters the arcuate portion 39, it raises or lowers the cam member 25 about the pin 23 in a manner which conforms to the shape of the arcuate portion 39. As depicted in FIG. 18, when the pin 23 abuts against the end of the cam groove 26, the sliding panel 4 is tilted up to the maximum angle. In the state shown in FIG. 19, the sliding panel 4 is held inclined at an angle of 1° when movement of the pin 23 (namely movement of shoe 15) is halted.

Figure 20:
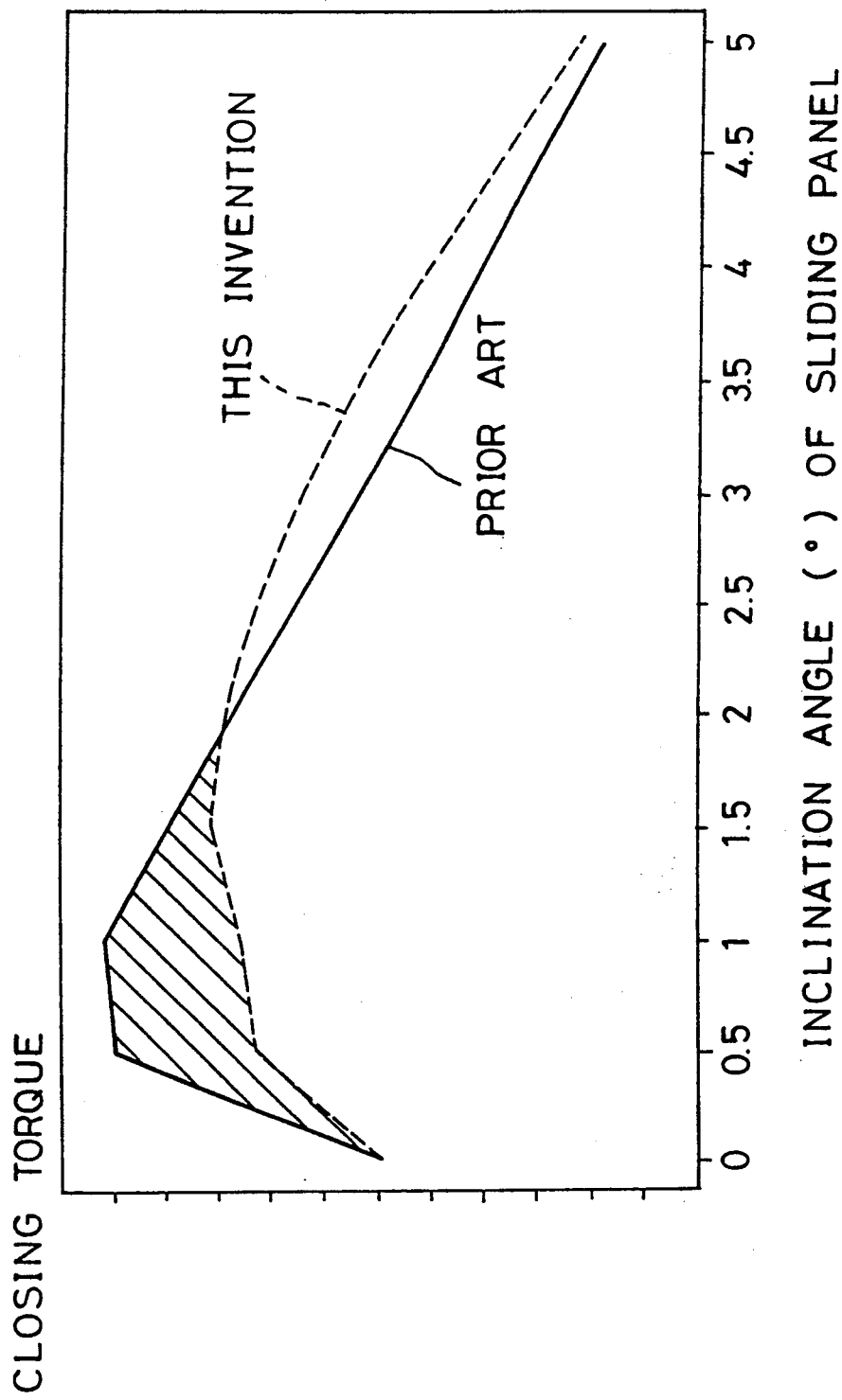
FIG. 20 is a graph illustrating the relationship between the angle of inclination of a sliding panel and the torque necessary to close the sliding panel.

Movement of the pin 23 in the arcuate portion 39 takes place without the pin 23 being disturbed by a suction force, and the pin 23 does not meet great resistance when sliding. This makes it possible to reduce the torque necessary to close the sliding panel 4 at an inclination angle of 2° or less, as indicated by the dashed line in FIG. 20.

Thus reducing the torque needed to close the sliding panel makes it possible to use a smaller motor. This in turn makes it possible to enlarge headroom correspondingly or to install additional equipment.

As many apparently widely different embodiments of the present invention can be made without departing from the spirit and scope thereof, it is to be understood that the invention is not limited to the specific embodiments thereof except as defined in the appended claims.

What is claimed is:

1. An outer sliding-type sunroof assembly for an automotive vehicle having a roof panel provided with an opening, comprising:

a housing fixedly secured to an inner side of the roof panel to surround the opening, said housing having opposing sides extending longitudinally of the vehicle;

a sliding panel for opening and closing the opening of said roof panel; and a mechanism to support and actuate the sliding panel, the mechanism being mountable on each of the opposing longitudinal sides of the housing, the mechanism comprising:

a longitudinally oriented guide rail having a slide channel;

a shoe disposed in said guide rail so as to be freely slidable longitudinally of the vehicle, said shoe having a pin;

a cam member having a cam groove;

the pin of said shoe being engaged with the cam groove of said cam member and being movable therealong;

said sliding panel being connected to said shoe via said cam member for opening and closing the opening of said roof panel;

a driving source for sliding said shoe along said guide rail longitudinally of the vehicle;

bracket fixedly secured to said cam member and said sliding panel and having a pin implanted therein;

a link having first and second ends, said first end of said link being pivotally attached to the pin of said shoe engaged with the cam groove of said cam member; and a lever member having one end to which the second end of said link is pivotally attached, said lever member being slidably connected to said cam member and said bracket so as to be relatively movable longitudinally of the vehicle in operative association with said shoe;

wherein, when said sliding panel is in a fully closed state with the pin of said shoe at a forward end of the cam groove, the lever member is folded downwardly by the pin implanted in said bracket so that said lever member is accommodated in a space within the slide channel of said guide rail.

2. The sunroof according to claim 1, wherein said lever member is provided with a pin, and said guide rail is provided with a cut-out portion in an upper surface of a rearward part thereof; and when said sliding panel is moved to an up-tilted state with the pin of said shoe at a rearward part of the cam groove, the pin of said lever member is free to rise through the cut-out portion; and when said sliding panel is moved to the fully closed state with the pin of said shoe at a forward part of the cam groove, the pin of said lever member enters the cut-out portion and is received within the slide channel of said guide rail, with up-and-down motion of the pin of said lever member within the slide channel being limited by said guide rail, whereby up-and-down motion of said sliding panel is limited.

3. The sunroof according to claim 1, wherein said lever member is provided with a pin, and wherein, when said sliding panel is in the fully closed state, the pin of said shoe is at a forward end of said cam member, the pin of said lever member is received by the slide channel of said guide rail so that up-and-down motion of said slide panel is limited.

4. The sunroof according to claim 1, wherein said lever member is provided with a spring means for biasing said lever member forwardly at all times in such a manner that movement of said lever member is controlled.

5. The sunroof according to claim 1, wherein the mechanism further comprises a resilient roller supported by said cam member, wherein when said cam member is pushed upwardly with the pin of said shoe residing in the cam groove along a cam face thereof, said resilient roller comes into resilient contact with an inclined surface of a recess formed in said guide rail and is displaced upwardly and in the direction of sliding panel opening movement, and when said resilient roller is displaced in the direction of sliding panel opening movement on a flange of said guide rail, said resilient roller rolls while flexing, with relative contact positions between said roller and said recess and between the pin of said shoe and said cam groove being shifted.

6. The sunroof according to claim 1, wherein said shoe is integrally formed to have an upstanding wall at a position on the outboard vehicle side of said pin, said upstanding wall serving to limit movement of said bracket toward the outboard side of the vehicle.

7. The sunroof according to claim 1, wherein said cam groove comprises a straight portion and an arcuate portion connected to said straight portion, said arcuate portion having a center of curvature located below said straight portion, and when the pin of said shoe slides along said arcuate portion, said sliding panel is tilted up or tilted down.

* * * * *

UNITED STATES PATENT AND TRADEMARK OFFICE
CERTIFICATE OF CORRECTION

PATENT NO. : 5,154,482

DATED : October 13, 1992

INVENTOR(S) : Hayashi et al.

It is certified that error appears in the above-identified patent and that said Letters Patent is hereby corrected as shown below:

Claim 1, column 11, line 10, before "bracket" insert --a--.

Claim 4, column 12, line 11, after "with" delete "a".

Signed and Sealed this

Nineteenth Day of October, 1993

Attest:

BRUCE LEHMAN

*Attesting Officer*  *Commissioner of Patents and Trademarks*